United States Patent [19]

Bassell et al.

[11] Patent Number: 5,438,895
[45] Date of Patent: Aug. 8, 1995

[54] FASTENER AND DRIVING TOOL

[76] Inventors: Marvin Bassell, 5600 NW. 59th St., Tamarac, Fla. 33319; David Byron, 585 Queen's Mirror Cir., Casselberry, Fla. 32707; Robert J. Catanzaro, 2880 NE. 28th St., Fort Lauderdale, all of Fla. 33306

[21] Appl. No.: 236,285

[22] Filed: Apr. 29, 1994

Related U.S. Application Data

[63] Continuation-in-part of Ser. No. 16,011, Feb. 10, 1993, abandoned.

[51] Int. Cl.⁶ .............................................. B25B 23/08
[52] U.S. Cl. ........................................ 81/451; 81/436; 411/407
[58] Field of Search ................. 81/436, 451, 456, 460, 81/461; 411/402–407, 919

[56] References Cited

U.S. PATENT DOCUMENTS

| | | |
|---|---|---|
| 132,946 | 11/1872 | Armstrong . |
| 1,056,095 | 3/1913 | Groos . |
| 1,797,390 | 3/1931 | Wood . |
| 2,304,704 | 12/1942 | O'Leary . |
| 2,677,985 | 5/1954 | Vaughn . |
| 2,684,094 | 7/1954 | Lissy . |
| 2,792,039 | 5/1957 | Wing . |
| 4,130,152 | 12/1978 | Bolen . |
| 4,311,071 | 1/1982 | Bassell . |
| 4,339,971 | 7/1982 | Zatorre . |
| 4,497,225 | 2/1985 | Vaughn . |
| 4,538,486 | 9/1985 | Lutrat . |
| 4,571,039 | 2/1986 | Desjardins . |
| 4,936,172 | 6/1990 | Jackson . |

FOREIGN PATENT DOCUMENTS 1167293  5/1984  Canada .

*Primary Examiner*—D. S. Meislin
*Attorney, Agent, or Firm*—Ruden, Barnett, McClosky, Smith, Schuster & Russell

[57] ABSTRACT

A fastening system comprises a driving tool formed with a rectangular-shaped bit at its driving end, and a fastener such as a screw whose head is formed with a recess defining a central slot and four spaced undercuts each having parallel upper and lower walls and a side wall perpendicular thereto. The bit of the driving tool is inserted within the central slot of the recess and then rotated such that the side edges of the rectangular bit contact the side walls of two of the undercuts, and the top wall and bottom surface of the bit frictionally engages the upper and lower walls of such undercuts. Frictional engagement between the undercuts and the driving tool bit provides a positive, temporary interlock therebetween, and contact between the side edges of the driving tool and side walls of the undercuts permits the transfer of torque over a large surface to reduce wear.

9 Claims, 3 Drawing Sheets

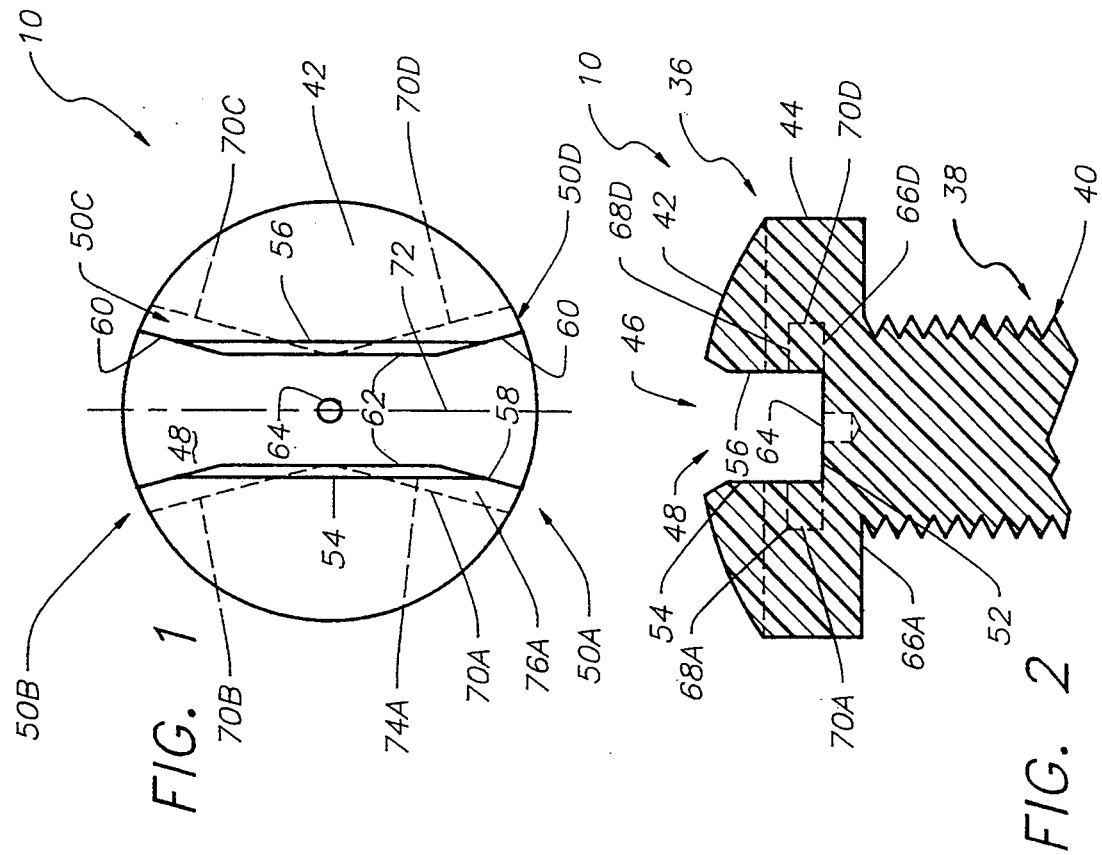
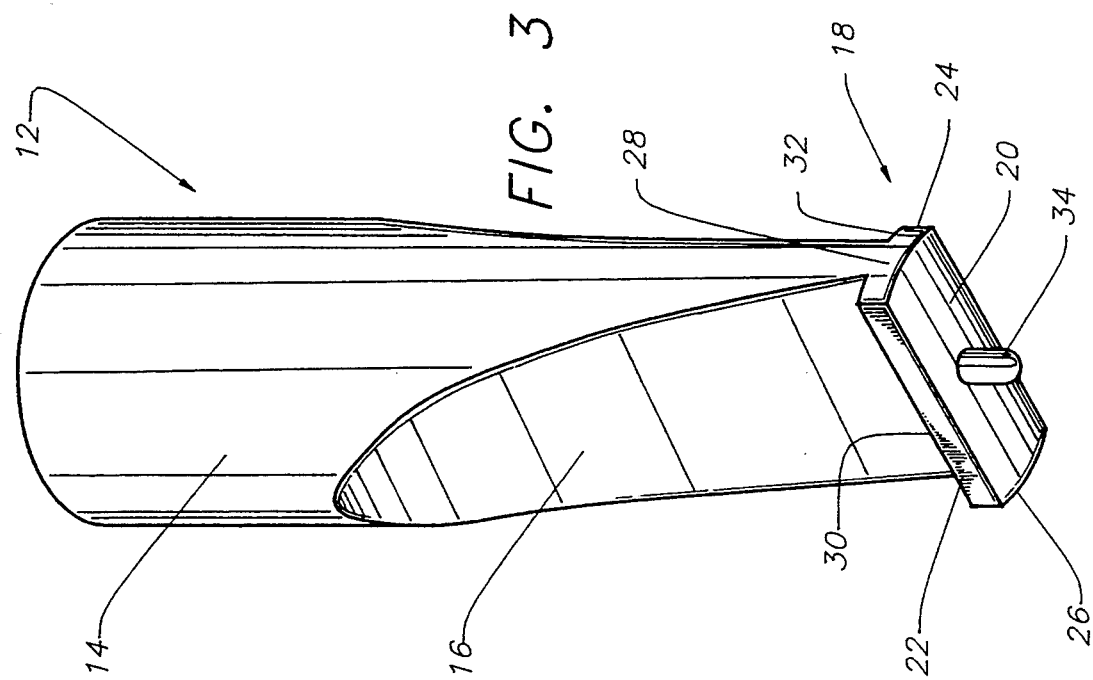

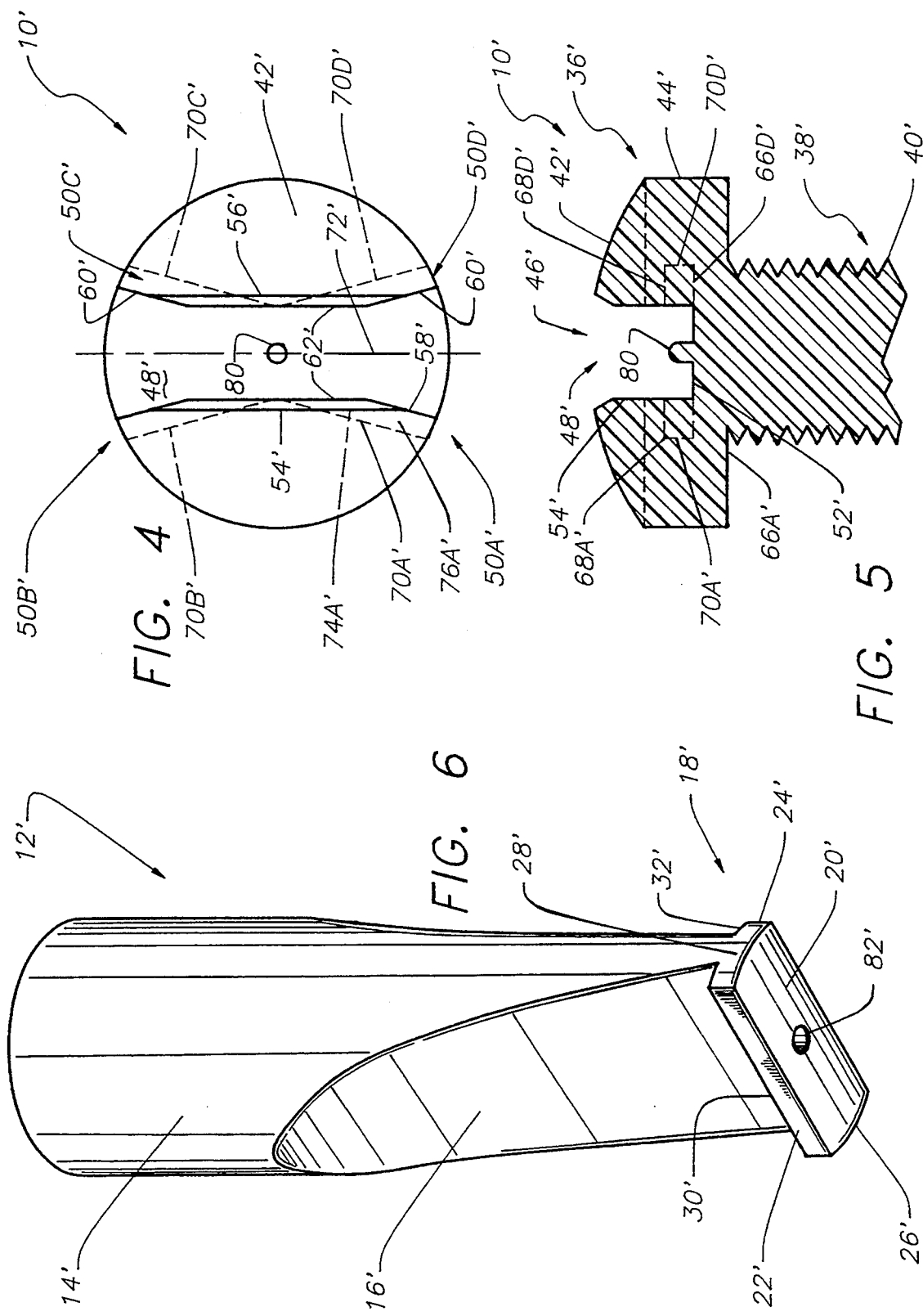

FASTENER AND DRIVING TOOL

This is a Continuation-In-Part of application Ser. No. 08/016,011, entitled FASTENER AND DRIVING TOOL, filed Feb. 10, 1993, now abandonded.

FIELD OF THE INVENTION

The invention is directed to fastening systems, and, more particularly, to the combination of a driver and fastener in which the driving end of the driver frictionally interlocks with the head of the fastener to permit insertion of the fastener with minimal end load and with minimal wear on the driver and fastener.

BACKGROUND OF THE INVENTION

In conventional fastening systems, e.g. a screw driver and screw, the driver often slips out of the recess in the head of the screw, particularly when the recess is formed in the shape of a single groove or a "Phillips" head configuration. Slippage can occur during the last few turns in driving the screw into a workpiece, in starting the screw or taking it out, and, especially, if the recess of the screw, or the tip of the screwdriver, is worn. As a result of this slippage, axial pressure or end load must be applied to the screwdriver to prevent its driving end from repeatedly slipping out over the walls of the recess or groove in the screw head. But the application of substantial axial pressure or end load on the screw is very often undesirable, particularly in medical applications where bone screws are employed to repair fractures and other damage to bone. The application of a high end load to a bone screw can further damage already traumatized bone tissue and must be minimized. Additionally, if the screwdriver slips from the screw while applying a high end load force, the surface of the material containing the screw may be scratched and marred by the slipping of the screwdriver blade. This problem becomes quite serious in working with finished hardwood constructions, where the screwdriver may scratch or disfigure the work. Moreover, once a screwdriver has slipped from the recess of a screw, it becomes more difficult to prevent its recurrence. The more times the blade slips, the more rounded the recess walls become, making it even more difficult to screw or unscrew the screw.

Another aspect of fastening systems involves the problem of starting the insertion of the screw into a given material. With a conventional screwdriver, an operator usually holds the screw in one hand while operating the driving tool with the other. It may not always be possible or efficient to pre-drill the screw hole, and/or the location where the screw must be inserted may make this starting operation difficult. As a result, the screw is often repeatedly dropped, requiring reapplication and wasted effort.

Interlocking driver and fastener systems have been developed to solve problems of the type mentioned above. U.S. Pat. No. 4,339,971, for example, discloses a driving tool and fastener in which the head of the fastener is formed with a generally inverted T-shaped recess or slot and a rectangular-shaped bit is formed at the driving end of the driving tool. When the bit of the driving tool is placed in engagement with the head of the screw, opposite corner edges of the bit enter and wedge into contact with one or more undercuts formed in the screw head by the recess. These undercuts or cutouts each include a tapered upper wall engageable with the corners of the driver bit along a limited surface area, e.g. no more than line contact is provided therebetween. As a result, when the driver bit wedges into position on the screw head, substantial wear is created in both the driver and screw because they only contact and transfer torque between one another along a relatively small area.

Other systems have complementary obliquely angled wedge-type surfaces on the driver and fastener. U.S. Pat. Nos. 132,946; 1,056,095; 2,304,704; 2,684,094; and 4,311,071; and Canadian Patent No. 1,167,293, for example, generally disclose a non-slip screwdriver and screw head system wherein the sides of the screw head recess and the sides of the driver are angled complementarily and obliquely in relation to the axis of the driver and the screw head. These two wedge-like surfaces form an oblique, interlocking couple when the driver and screw engage one another. While the driver and fastener of interlocking systems of the type disclosed in the above-listed patents form a large area of contact between the sides of the driver and the walls of the fastener head, they do not form a stable interlocking system. As a result, the driver and screw can disengage one another, and, in certain alignments, the fastener tends to slip from the driver.

Another fastener system is disclosed in U.S. Pat. No. 4,936,172 to Jackson, which comprises a fastener head formed with a pair of undercuts on opposite sides of a central slot within which the rectangular shaped driving end of a driver is insertable. Each of the undercuts includes a sidewall and shoulders which extend outwardly from the respective sidewalls. The driving end of the fastener includes an outermost extent formed with opposed notches or grooves defining flange regions at the base of the outermost extent. The blade of the driver slidably mounts a sleeve which carries longitudinal extensions on opposite sides thereof. In order to utilize the fastener system disclosed in the Jackson Patent No. 4,936,172, the driving end of the driver is inserted within the central slot of the fastener head and rotated in a single direction such that the shoulders of the undercuts are captured within the grooves in the driving end of the driver. Operative engagement of the driver and fastener is achieved by thereafter sliding the sleeve downwardly along the driver blade until the longitudinal extensions engage the base of the slot and the fastener head. The longitudinal extensions fill the void areas of the slot and the fastener head, and they exert a downwardly directed force which wedges the flanged regions of the driver upwardly against the shoulders of the undercuts in the fastener head.

The construction of the Jackson '172 fastener system is extremely complicated and difficult to manufacture. Locking between the driver and head of the fastener is dependent upon the use of a sliding sleeve and longitudinal extensions in order to ensure that the driver and fastener do not disengage as the fastener is being inserted into a workpiece. This construction is expensive and is susceptible to failure after an extended period of use.

SUMMARY OF THE INVENTION

It is therefore among the objectives of this invention to provide a fastening system including the combination of a driving tool and fastener in which minimal end load is required to insert the fastener, which substantially avoids disengagement between the driving tool and fastener, which reduces wear of the driving tool and fastener and which provides for rapid and efficient orientation between the fastener and driving tool.

These objectives are accomplished in a fastening system which comprises a driving tool formed with a rectangular-shaped bit at its driving end, and a fastener such as a screw whose head is formed with a recess defining a central slot and four spaced undercuts each having an upper surface parallel to the base of the central slot and a side wall perpendicular thereto. The bit of the driving tool is inserted within the central slot of the recess and then rotated such that the side edges of the rectangular bit contact the side walls of two of the undercuts, and the top and bottom walls of the bit frictionally engage the upper and lower surfaces of the undercuts. Engagement between the upper surface of the undercuts and the top wall of the driving tool bit, as well as between the bottom wall of the bit and the lower surface of the undercuts provides a positive, frictional interlock or "cold weld" therebetween, and contact between the side edges of the driving tool and side walls of the undercuts permits the transfer of torque therebetween over a large surface area which minimizes wear.

More specifically, in the presently preferred embodiment, the fastener comprises an elongated cylindrical-shaped shaft which is threaded along at least a part of its length and has a rounded or flat head at the opposite end. The fastener head is formed with an inverted, generally T-shaped recess extending from edge-to-edge which defines a central slot having flared ends, and, four undercuts, two at each of the flared ends on opposite sides of the central slot. Each of the undercuts has a planar bottom surface coincident with the base of the central slot, an upper surface extending parallel to the bottom surface which tapers outwardly at an angle of about 15° relative to the longitudinal axis of the central slot from its center to the flared ends thereof, and, a side wall extending vertically upwardly between the bottom surface and upper surface of the undercut.

The complementary driving tool of this invention comprises a shank having an inverted generally T-shaped blade at its operative end including a rectangular-shaped bit having a planar bottom wall, opposed side edges, opposed ends and a planar top wall. The bit of the driving tool is vertically insertable within the T-shaped central slot of the fastener so that its bottom wall engages the base of the central slot. The driving tool is then rotated about 15° so that the side edges of the bit engage the side wall of two of the undercuts, located on opposite ends and opposite sides of the central groove, and so that the top wall of the bit extends beneath the upper wall of such undercuts. The tolerances of the height dimension of the bit extending between its top and bottom walls, and the height dimension defined by the space between the upper and lower walls of the undercuts, are such that the top and bottom walls of the bit frictionally engage and form a temporary cold weld with the upper and lower walls of the undercuts, respectively. This temporarily interlocks the driving tool and fastener to prevent disengagement. Additionally, the side edges of the bit contact substantially the entire surface area of the side wall of the undercuts, thus providing a large bearing surface to transfer torque therebetween. Preferably, the driving tool and fastener also include centering structure, e.g. a projection formed on one of the tools and fasteners which is insertable within a hole formed in the other, to properly position and align the driving tool and fastener when they first contact one another.

The driving tool and threaded fastener of this invention are simple in construction, can be manufactured according to conventional techniques, and are easy to use. The positive frictional interlock provided therebetween not only prevents slippage of the driving tool from the fastener during insertion or removal thereof, but also provides positive temporary engagement of the driving tool with the fastener prior to presentation of the screw to the workpiece and after the screw is fully unscrewed. As a result, the fastener can be presented to the workpiece in any position, including overhead, without the fastener falling off the driving tool and with it in proper alignment. The engagement of the side edge of the driving tool bit with the side wall of the undercuts in the screw provides a wide area of contact for the application of rotational force on the fastener, creating less wear on the driver and on the fastener.

BRIEF DESCRIPTION OF THE DRAWINGS

The structure, operation and advantages of the presently preferred embodiment of this invention will become further apparent considering the following description, taken in conjunction with the accompanying drawings, wherein:

FIG. 1 is a plan view of a fastener according to this invention with a chamfered centering hole;

FIG. 2 is a side view in cross-section taken down the center line of the fastener shown in FIG. 1;

FIG. 3 is a partial perspective view of a driving tool with a centering projection for rotating the fastener shown in FIG. 1;

FIG. 4 is a plan view of an alternative embodiment of a fastener according to the invention with a centering projection;

FIG. 5 is a side view in cross-section taken down the center line of the fastener shown in FIG. 4;

FIG. 6 is a partial perspective view of a driving tool with a chamfered hole for rotating the fastener shown in FIG. 4;

DETAILED DESCRIPTION OF THE INVENTION AND THE PREFERRED EMBODIMENTS

Figures 7, 8:
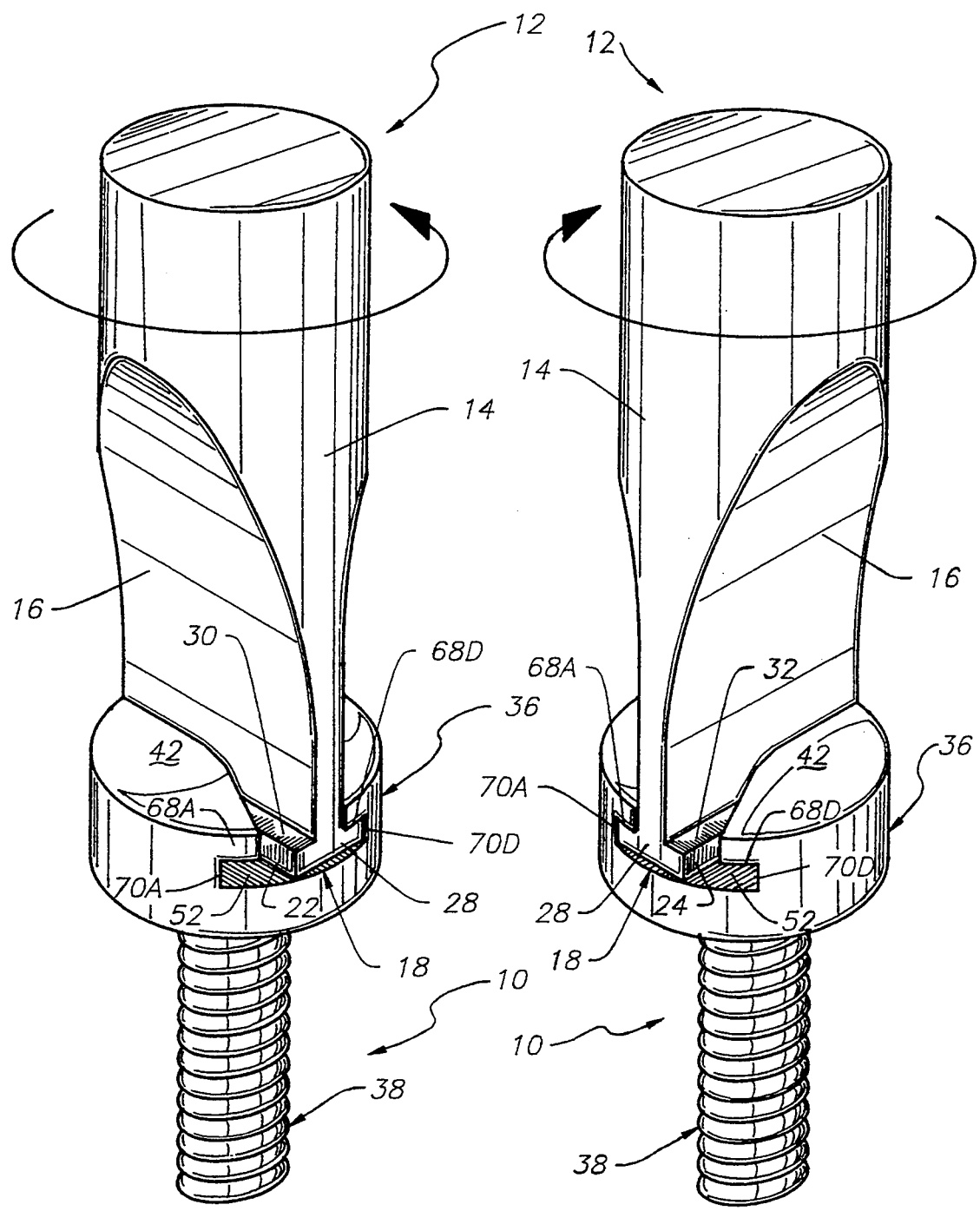
FIG. 7 is a perspective view of the fastener and driving tool of FIGS. 1–3 wherein the driving tool engages one side of the recess in the fastener head.
FIG. 8 is a view similar to FIG. 7 except with the driving tool shown in position on the opposite side of the fastener head recess.

Referring to FIGS. 1–3, one embodiment of a fastener 10 for use in combination with a driving tool or driver 12 is illustrated. The driver 12 comprises a cylindrical shank 14 having an inwardly tapering blade portion 16 which terminates with a rectangular-shaped plate or bit 18. The bit 18 includes a planar bottom surface 20, a pair of opposed side edges 22, 24, opposed ends 26, 28 and top walls 30, 32 which are separated by the blade portion 16 of the shank 14. The bit 18 therefore has a height dimension defined by the height of the side edges 22, 24 or the distance between bottom surface 20 and top walls 30, 32, a length dimension between the opposed ends 26, 28 and a thickness or width dimension defined by the distance between the side edges 22, 24, e.g. along the ends 26, 28.

In the embodiment of FIGS. 1–3, a projection 34 extends outwardly from the center of the bottom surface 20 of bit 18, for purposes described below. The end of the shank 14 of the driving tool 18 opposite the bit 18 can be provided with any of various handles (not shown) such as is commonly provided on screwdrivers. It can also be provided with various conventional configurations allowing the driving tool 10 to be used with a power unit such as a drill. The shank 14 can be of any cross-section as desired including, but not limited to, square, hexagonal or cylindrical.

The threaded fastener 10 includes a head 36 connected to or integrally formed with a shaft 38 which has threads 40 at least partially along its length. The head 36 is formed with a convex, circular-shaped top surface 42 and a circular body portion 44 extending to the shaft 38. In the presently preferred embodiment, the head 36 is formed with a generally inverted T-shaped recess 46 which extends diametrically from one edge of the head 36 to the other and defines a central slot 48 and four undercuts 50A, 50B, 50C and 50D. As depicted in FIGS. 1 and 2, the central slot 48 includes a planar base surface 52 and opposed side walls 54, 56 which are parallel to one another along the majority of the length of central slot 48 and then taper outwardly to form tapered ends 58 and 60 on each end of central slot 48. Preferably, a chamfer 62 is formed at the top of each side wall 54, 56 along the parallel portions thereof. Additionally, a chamfered hole 64 is formed in the head 36 at the center of central slot 48 which extends inwardly from the base surface 52 thereof.

Each of the undercuts 50A-D in the fastener head 36 have the same structure, and thus only undercut 50A is described herein with the same reference numbers being applied to the other undercuts 50B-D including the appropriate letter. The undercut 50A is formed with a bottom wall 66A coincident with the base surface 52 of central slot 48, an upper wall 68A spaced from the bottom wall 66A and a side wall 70A extending between the bottom surface 66A and upper wall 68A. As best seen in FIG. 1, the side wall 70A of undercut 50A is oriented at an angle of about 15° relative to the longitudinal axis 72 of central slot 48 beginning at the center of the fastener head 36 and extending to the outer edge. The side wall 70C of undercut 50C is similarly angled so that such side walls 70A and 70C are parallel to one another. Side walls 70B and 70D have the same angular relation to axis 72, and are also parallel to one another. The upper wall 68A has a roughly pie-shaped configuration including a narrow portion 74A extending between the undercut side wall 70A and the parallel portion of side wall 54 of central slot 48, and a wider portion 76A extending between the undercut side wall 70A and the tapered end 58 of side wall 54. As noted above, each of the other undercuts 50B-D have the same structure as undercut 50A.

The embodiment of this invention depicted in FIGS. 1–3 is intended for use with fasteners 10 formed from different metals depending on the application. For example, fasteners 10 made of steel, brass, bronze, aluminum and the like would be utilized in a variety of industrial, commercial and residential applications of the same general type as metal screws and wood screws are currently utilized. The driver 12 is made of tool steel or other hardened metal for use with such fastener. In medical applications, the fastener 10 can be used as a bone screw and is preferably formed of titanium, surgical steel, a cobalt-chrome-molybdenum alloy, a titanium-aluminum-vanadium alloy and others, whereas the driver 12 is made of similar materials.

The embodiment of FIGS. 4–6 is essentially identical to that of FIGS. 1–3, and common structural elements are identified with the same reference numbers in FIGS. 4–6 with the addition of a "'". The primary difference in the fastener 10' of FIGS. 4–6 is that it is formed of a plastic material, e.g. polypropylene, polyvinylchloride and any other suitable plastic materials which are capable of being injection molded. Because of the use of injection molding in the formation of the fastener 10', a centering projection 80 is formed at the center of the base surface 52' of center slot 48' while a mating hole 82 is formed in the driver 12'. This is essentially the same centering structure as employed in the embodiment of FIGS. 1–3, except that the position of the projection and hole are reversed between the fastener 10' and the driver 12'. Otherwise, the fastener 10' and driver 12' are structurally and functionally identical to that described above. It is contemplated that plastic fastener 10' would have greatest utility in some types of medical applications, in marine applications and in other environments where metal screws are susceptible to rusting and other degradation due to the elements.

Fastener System Operation and Example

The operation of the driver 12 and fastener 10 depicted in FIGS. 1–3 is described with reference to a specific example, with the understanding that the embodiment shown in FIGS. 4–6 is functionally identical. It should also be understood that the dimensions of bit 18, groove 48 and undercuts 50A–D given in the Example are specific to one size or driver 12 and fastener 10, and other sizes of same could be employed without departing from the scope of the invention. As such, the dimensions noted below are intended to reflect the structural relationship between the bit 18 and head 36, and the relative tolerances thereof.

| Example | | |
|---|---|---|
| Bit 18 | | |
| Height dimension: | 0.030 in. | +0.000 |
| | tolerance | −0.002 |
| Width dimension: | 0.090 in. | +0.000 |
| | tolerance | −0.002 |
| Length dimension: | 0.240 in. | +0.005 |
| | tolerance | −0.005 |
| Bit projection 34 | | |
| Height dimension: | 0.023 in. | +0.000 |
| | tolerance | −0.002 |
| Diameter: | 0.025 in. | +0.000 |
| | tolerance | −0.002 |
| Undercuts 50A-D | | |
| Height dimension: | 0.032 in. | +0.002 |
| | tolerance | −0.000 |
| Bore 64 in Slot 48 | | |
| Height dimension: | 0.025 in. | +0.002 |
| | tolerance | −0.000 |
| Diameter: | 0.035 in. | +0.002 |
| | tolerance | −0.000 |

Initially, the bit 18 of the driver 12 is inserted into the central groove 48 in the head 36 of the fastener 10. The bit 18 is properly positioned within the central groove 48 by engagement of the projection 34 of fastener 10 and the hole 64 formed in the screw head 36. Alternatively, in the embodiment of FIGS. 4–6, such centering between the fastener 10' and driver 12' is obtained by insertion of the projection 80 of the fastener 10' within the hole 82 in the driver 12'.

In order to interlock the fastener 10 and driver 12, either one of these elements is rotated approximately 15° in the clockwise direction so that the side edge 24 of the bit 18 engages the side wall 70C of undercut 50C, and the side edge 22 of bit 18 engages the side wall 70A of undercut 50A. See FIG. 8. Because of the length of the bit 18, it spans essentially the entire length of the central groove 48 and, therefore, the side edges 22, 24 of bit 18 engage the undercuts 50A and 50C located at opposite ends of the central groove 48 and on opposite sides of its longitudinal axis 72.

In the course of entering the undercuts 50A and 50C, the top wall 30 of bit 18 slides beneath the upper wall 68A of undercut 50A, and the top wall 32 of bit 18 slides beneath the upper wall 68C of undercut 50C. At the same time, portions of the bottom surface 20 of bit 18 slide along the bottom wall 66A of undercut 50A and the bottom wall 66C of undercut 50C. The height dimension of the bit 18 between its bottom surface 20 and top walls 30, 32, and the height dimension of undercuts 50A, 50C between their respective upper and lower walls 68A, 66A and 68C, 66C, is such that the bit 18 is frictionally interlocked and retained within each of the undercuts 50A, 50C when rotated therein. As noted in the above example, the difference in height dimensions between the bit 18 and undercuts 50A, 50C is preferably about 0.002 in., which ensures that the bit 18 forms a "cold weld" or a temporary frictional interlock within each undercut 50A and 50C. Consequently, the bit 18 is frictionally retained within the head 36 of the fastener 10 without any additional wedge members or other structure.

A number of important advantages are provided by the construction of the fastener 10 and driver 12 of this invention. When the fastener 10 and driver 12 are interlocked, the side edges 22 and 24 of the bit 18 of driver 12 engage substantially the entire surface area of the side walls 70A and 70C of undercuts 50A, 50C, respectively. This provides a large surface area for the transfer of torque between the driver 12 and fastener 10 which substantially eliminates undue wear on either element. This is in contrast to prior art devices in which only point contact or line contact is obtained between the driver and fastener for the transfer of torque therebetween. Additionally, the construction of the driver 12 and fastener 10 provides a reliable and releasable frictional interlock or cold weld therebetween so that the fastener 10 can be positioned at essentially any angular orientation while being held only by the driver 12. As noted above, the top walls 30, 32 slide underneath the pie-shaped upper surfaces 68A and 68C of the undercuts 50A and 50C, and portions of the bottom surface 20 of bit 18 slide atop bottom walls 66A, 66C of undercuts 50A, 50C. This comparatively large area of contact therebetween provides for a secure but releasable connection of the fastener 10 and driver 12, which, in turn, substantially eliminates the application of an end load to the driver 12 in order for it to remain in engagement with the fastener 10.

While the operation of fastener 10 and driver 12 have been described with reference to an insertion of the fastener 10 within a workpiece, it should be understood that the fastener 10 could be removed from the workpiece by simply rotating the driver 12 in the opposite, counterclockwise direction. In that instance, the side walls 22, 24 of the bit 18 of driver 12 contact the side walls 70B and 70D of undercuts 50B and 50D, respectively. See FIG. 7. The same interlocking arrangement between the driver 12 and fastener 10 is obtained between the bit 18 and such undercuts 50B and 50D so that when the fastener 10 is removed from the workpiece it is interlocked with the driver 12 and can be transferred from the workpiece without the operator having to support the fastener 10.

While the invention has been described with reference to a preferred embodiment, it should be understood by those skilled in the art that various changes may be made and equivalence may be substituted for elements thereof without departing from the scope of the invention. In addition, many modifications may be made to adapt a particular situation or material to the teachings of the invention without departing from the essential scope thereof.

For example, while the fastener 10 has been shown with a generally circular head 36 having a convex top surface 42, it should be understood that fasteners having heads of other configurations such as flat, concave or the like could be utilized so long as a recess 46 of the type disclosed herein can be formed in such heads. Further, the shaft 38 of fastener 10 need not be threaded along its entire length as depicted in the Figs., depending upon the requirements of a particular application.

Therefore, it is intended that the invention not be limited to the particular embodiment disclosed as the best mode contemplated for carrying out this invention, but that the invention will include all embodiments falling within the scope of the appended claims.

We claim:

1. A fastener system, comprising:
   a driver formed with a substantially rectangular-shaped driving end having a top wall, a bottom surface, opposed ends and opposed side edges perpendicular to said top wall and to said bottom surface, said side edges being spaced from one another to define the width of said driving end and said side edges having a height dimension which defines the height of said driving end between said top wall and said bottom surface;
   a fastener having a head connected to a shaft which is insertable within a workpiece, said head being formed with a central slot having a base surface and opposed, upwardly extending side walls located on either side of a longitudinal axis, said central slot having a width greater than said width of said driving end of said driver, said head being formed with at least two undercuts located on opposite sides of said longitudinal axis each extending at an angle into one of said sidewalls formed by said central slot, each of said undercuts forming a substantially truncated pie-shaped upper wall whose width increases from the center of said central slot toward the edge of said fastener head, a bottom wall substantially coincident with said base surface of said central slot and being located beneath said upper wall, and a side wall extending perpendicularly between said upper wall and said bottom wall to define a height dimension of said undercuts;
   said driving end of said driver being insertable within said central slot of said head of said fastener, said driving end and said fastener head being movable relative to one another so that each of said side edges of said driving end contacts substantially the entire surface area of one of said side walls of said undercuts and so that said top wall of said driving end extends beneath said upper wall of each of said undercuts and said bottom surface of said driving end extends atop said bottom wall of each said undercuts, said height dimension of said driving end and said height dimension of each said undercuts being such that said top wall and bottom surface of said driving end frictionally engage and temporarily interlock with said upper wall and bottom wall of said undercuts, respectively, to frictionally retain said driving end of said driver within said head of said fastener.

2. The fastening system of claim 1 in which said side wall of each of said undercuts is formed at an angle of about 15° relative to said longitudinal axis from the center of said central slot to the edge of said fastener head.

3. The fastening system of claim 1 in which said side wall of one of said undercuts is parallel to said side wall of the other of said undercuts.

4. The fastening system of claim 1 in which said head is formed with four undercuts, two on each side of said longitudinal axis.

5. A fastening system, comprising:

a driver formed with a substantially rectangular-shaped driving end having a top wall, a bottom surface, opposed ends and opposed side edges perpendicular to said top wall and to said bottom surface, said side edges being spaced from one another to define the width of said driving end and said side edges having a height dimension which defines the height of said driving end between said top wall and said bottom surface;

a fastener having a head connected to a shaft which is insertable within a workpiece, said head being formed with a central slot having a base surface and opposed, upwardly extending side walls located on either side of a longitudinal axis, said central slot having a width greater than said width of said driving end of said driver, said head being formed with at least two undercuts located on opposite sides of said longitudinal axis each of which extend at an angle into one of said sidewalls formed by said central slot, each of said undercuts forming a substantially truncated pie-shaped upper wall whose width increases from the center of said central slot toward the edge of said fastener head, a bottom wall substantially coincident with said base surface of said central slot and being located beneath said upper wall, and a side wall extending perpendicularly between said upper wall and said bottom wall to define a height dimension of said undercuts;

said driving end of said driver being insertable within said central slot of said head of said fastener, said driver and said fastener each being formed with centering means for properly positioning said driving end of said driver relative to said fastener upon insertion of said driving end of said driver into said central slot;

said driving end being movable relative to said head so that each of said side edges of said driving end contacts substantially the entire surface area of one of said side walls of said undercuts and so that said top wall of said driving end extends beneath said upper wall of each of said undercuts and said bottom surface of said driving end extends atop said bottom wall of each said undercuts, said height dimension of said driving end and said height dimension of each said undercuts being such that said top wall and bottom surface of said driving end frictionally engage and temporarily interlock with said upper wall and bottom wall of said undercuts, respectively, to frictionally retain said driving end of said driver within said head of said fastener.

6. The fastening system of claim 5 in which said centering means includes a projection extending outwardly from said bottom surface of said driving end of said driver, and a hole formed in the center of said central slot of said fastener head which receives said projection.

7. The fastening system of claim 5 in which said centering means includes a hole extending inwardly from said bottom surface of said driving end of said driver, and a projection extending outwardly from the center of said central slot of said fastener head which is insertable into said hole.

8. The fastening system of claim 5 in which said side wall of one of said undercuts is parallel to said side wall of the other of said undercuts.

9. The fastening system of claim 5 in which said head is formed with four undercuts, two on each side of said longitudinal axis.

* * * * *